(12) United States Patent
Chase

(10) Patent No.: US 7,364,069 B2
(45) Date of Patent: Apr. 29, 2008

(54) SYSTEM FOR AUTOMATIC CHECK-IN AND CHECK-OUT FOR SPACE OCCUPANCY

(76) Inventor: Douglas G. Chase, 1342 E. Mesquite St., Gilbert, AZ (US) 85296

( * ) Notice: Subject to any disclaimer, the term of this patent is extended or adjusted under 35 U.S.C. 154(b) by 315 days.

(21) Appl. No.: 11/168,942

(22) Filed: Jun. 27, 2005

(65) Prior Publication Data

US 2005/0236477 A1    Oct. 27, 2005

Related U.S. Application Data

(63) Continuation-in-part of application No. 10/706,234, filed on Nov. 12, 2003, now Pat. No. 7,252,227.

(51) Int. Cl.
*G06K 5/00* (2006.01)
(52) U.S. Cl. ................... 235/380; 235/381; 235/384
(58) Field of Classification Search .......... 235/380, 235/384, 381, 375; 705/5; 715/700
See application file for complete search history.

(56) References Cited

U.S. PATENT DOCUMENTS

| | | | |
|---|---|---|---|
| 5,183,142 A | | 2/1993 | Latchinian et al. |
| 5,732,398 A | * | 3/1998 | Tagawa ................. 705/5 |
| 6,061,668 A | | 5/2000 | Sharrow |
| 6,425,524 B2 | | 7/2002 | Pentel |
| 6,559,776 B2 | | 5/2003 | Katz |
| 6,606,602 B1 | | 8/2003 | Kolls |
| 6,606,605 B1 | | 8/2003 | Kolls |
| 6,609,102 B2 | | 8/2003 | Kolls |
| 2002/0038287 A1 | | 3/2002 | Villaret et al. |
| 2002/0062277 A1 | | 5/2002 | Foster et al. |
| 2002/0069093 A1 | | 6/2002 | Stanfield |
| 2002/0128923 A1 | | 9/2002 | Dale |
| 2002/0152179 A1 | | 10/2002 | Racov |
| 2003/0007627 A1 | | 1/2003 | Elsey et al. |
| 2003/0036930 A1 | | 2/2003 | Matos et al. |
| 2003/0055689 A1 | | 3/2003 | Block et al. |
| 2003/0061605 A1 | | 3/2003 | Genevois et al. |
| 2003/0078895 A1 | | 4/2003 | MacKay |
| 2003/0110133 A1 | | 6/2003 | Maritzen et al. |
| 2003/0120523 A1 | | 6/2003 | Jafri et al. |
| 2004/0167809 A1 | | 8/2004 | Jafri et al. |
| 2004/0249681 A1 | | 12/2004 | Staten et al. |
| 2006/0271852 A1 | * | 11/2006 | Lloyd et al. ............ 715/700 |

* cited by examiner

*Primary Examiner*—Karl D. Frech
(74) *Attorney, Agent, or Firm*—Advantia Law Group; Michael W. Starkweather; Jason P. Webb

(57) ABSTRACT

In one aspect of the invention, a novel method of purchasing commodities associated with a golf course at least includes: a) providing at least one kiosk under the dominion of a golf course operator; b) via the kiosk, providing to a prospective golfer, available tee times at the golf course; c) via the kiosk, allowing the prospective golfer to reserve one or more tee times; and d) at least partially via the kiosk, processing payment for the selected tee times. In another aspect of the invention, a novel method of purchasing commodities associate with a ski resort at least includes: a) providing at least one kiosk under the dominion of a ski resort operator; b) via the kiosk, providing to a prospective skier, ski lift information at the ski resort; c) via the kiosk, allowing the prospective skier to reserve one or more ski lift tickets; and d) at least partially via the kiosk, processing payment for the ski lift tickets.

20 Claims, 10 Drawing Sheets

SYSTEM FOR AUTOMATIC CHECK-IN AND CHECK-OUT FOR SPACE OCCUPANCY

CROSS-REFERENCES TO RELATED APPLICATIONS

This in a continuation-in-part of U.S. patent application Ser. No. 10/706,234 entitled "System for Automatic Check-In and Check-Out for Space Occupancy," filed on Nov. 12, 2003 (Examiner Karl D. Frech, Art Unit 6399), now U.S. Pat. No. 7,252,277, to which this application claims priority under 35 U.S.C. § 120.

BACKGROUND OF THE INVENTION

1. Field of the Invention

The present invention relates generally to a system for automatic check-in and/or check-out for space occupancy involving various reservation, leasing or rental entities. Specifically, there is a kiosk-like station, a based check-in and out system for reserving and renting of available space, like hotel, motel, cabin, storage unit, camp site, RV site, cruise cabin, etc.

2. Description of the Related Art

Renting, leasing or making reservations at commercial spaces like hotel, motel, cabin, storage unit, camp site RV site, boat slip (at a marina), cruise cabin and such is very common. Typically, a person must perform a standard sequence of steps to gain access to such spaces. For example, in renting a RV (recreational vehicle) site the person drives up to the main office, fills out some identification forms, is assigned an RV site, receives an identification tag to put in the front window and pays for the requested period of time for rental of that space. Thereafter, the user is then required to check out from the establishment renting that space. At other space rental facilities, the order of the sequence of steps may vary, but the steps typically exist in all systems.

There are many disadvantages with this old system. First, the facility space rental owner must always have a person at a check-in desk or phone in order for the user to gain access to the desired space for the desired time. Since many space renters arrive any time during a 24 hour period, it is often difficult, especially for small enterprises, to pay sufficient personnel to man the check-in stations twenty-four hours a day seven day a week or provide manual after hours check in/out methods. Although, illegal in some states, current after hours check in/out methods enable check in/out during off hours which could result in lost rental income. In addition, it will be appreciated that a significant amount of time is wasted for the space user to have to go through the check-in and check-out process, especially if there are other users waiting in line to do the same activity.

The following patents are offered to assist in understanding the state of the art known to be at least somewhat be related to the present invention, and are herein incorporated by reference for their supporting teachings:

U.S. Pat. No. 5,183,142, is an automated cashier system that provides for microprocessor-controlled product display, order acceptance, payment and change generation. Both cash and credit card payments are accepted. The system is preferably mounted in a cabinet having upper and lower sections. The upper section contains the input and output systems, while the lower section contains the cash receipt, storage and dispensation systems. The main microprocessor is also located in the lower section, which is preferably in the form of a safe which prevents access to the critical systems of the invention.

U.S. Pat. No. 6,061,668, is an integrated electronic system that has a network of appliances and machines, such as clothes washers and dryers, vending machines, or other equipment, controlled from a central management computer. Each networked apparatus is uniquely identified, and is maintained in an inoperative standby state, until a prospective user has a valid account for payment, and authorizes stated charges to be billed to their account, or optionally has presented a charge card, thus paying for use of the respective appliance or machine. Account information is maintained and processed in the central management computer, which can be interactively linked to a separate billing system, property management system or financial institution thereby automating the verification and billing process. Message data can be sent to and displayed on any or all appliances and machines, a periodic polling of the network ensures security, and an audit trail is generated, with the operational history of each apparatus on the network. Operation of any or all appliances and machines on the network can be inhibited, on command from the central management computer, and the system has extensive maintenance and diagnostic capabilities.

U.S. Pat. No. 6,425,524, is a generalized remote ordering apparatus for customer and employee use within a restaurant, auto repair facility, retail store, grocery store, airport, or other service facility, to place orders, determine the status of orders, access information, and allow the customer to pay the bill for the goods and/or services either by cash or credit card. The system comprises an input device having a keypad, a credit or debit card reader, a first memory, a first processor, and a transmitter. The input device is adapted to communicate with an ordering station having a receiver tuned to the transmitter. A second processor, located in the ordering station, is adapted to decode information received from the transmitter through the receiver and produce decoded information. A display is also provided in the ordering station and is adapted to display the decoded information. The ordering station also includes a second memory adapted to store item numbers and prices. A communications link from the ordering station to a point-of-sale system allows payment to be made by credit or debit card or by cash.

U.S. publication no. 20022/0038287 A1, with publication date Mar. 28, 2002, provides for a system and method which provide authentication for electronic transactions. The present invention involves inputting smart card information from a smart card into a payment enabled device and inputting an identification number into the payment enabled device. The smart card information and their identification number are then authenticated. Payment information is then sent from a server to a desired location after authenticating the smart card information and identification number.

U.S. publication no. 2002/0062277 A1, with publication date May 23, 2002 relates to completing a lease for property in an on-line computing environment. A distributed computer network can enable a user to access multiple databases and to obtain comparable data related to a property of interest for use in calculations. This can enable users to access the latest, broadest set of relevant property data and to select relevant comparable values quickly and with minimal manual intervention. An on-line property management environment can comprise a distributed computer network, such as the global internet, coupled to numerous client computers, a property services server platform connected to a local data base, and numerous property information databases. Building owners or their agents can list their available space for rent on a Web site hosted by property services server platform in a distributed computing environment. Commercial tenants or their agents requiring space can either directly enter the property services server platform or enter through allied sites.

It is believed that none of the above incorporated patents teach alone or in combination the present illustrated embodiments of the invention.

BRIEF SUMMARY OF THE INVENTION

The present invention has been developed in response to the present state of the art, and in particular, in response to the problems and needs in the art that have not yet been fully solved by currently available manual check-in/out methods. Accordingly, the present invention has been developed to provide a system for automatic check-in and/or check-out for various spaces by reservation, leasing, or rental or similar entities. Specifically, there is a kiosk based check-in/ and out system for reserving and renting of available space, like a hotel, motel, cabin, storage unit, camp site, RV site, harbor boat slip, cruise cabin, etc.

The present invention relates generally to a console 10 (also referred to as a kiosk or point of sale terminal) mounted to a pedestal 12, which itself is firmly affixed to the floor, such as by threaded studs 14. The console 10 includes an upper portion 16 bearing a video display tube 18 and the associated electronics, as well as a credit card reader 20, a receipt delivery aperture 22, and an indicator area 24 which displays check-in, check-out and other information and data. Access to the interior of the upper portion may be obtained through a locked access door 26.

A feature of the invention may be to provide an automated check-in and check-out for a user needing rental space. Specifically, there is an electronic device configured to: provide information regarding the rental space available for rental; provide the user with a way to select desired information; and provide for entry of data needed to use the rental space.

Another feature of the invention may be to have full functionality of the electronic device accessible via the internet.

Another feature of the invention may be to have the electronic device providing a location map for the user to locate the desired rental space.

Another feature of the invention may be to have the electronic device providing a picture of each rental space and that of related surrounding scenery.

Another feature of the invention may be to have the electronic device that works for many kinds of rental space such as: an RV park, hotel, motel, resort cabins, property storage units, camp sites, harbor boat slips, cruise ship cabins.

Yet a further feature of the invention may be for the electronic device to provide for a list of area places of interest. Wherein the list of area places of interest is selected from the group consisting of: parks, zoos, historic sites, museums, restaurants, vehicle repair, vehicle washing, grocery stores and pharmacies.

Another feature of the invention may provide for printing of selected data.

A feature of the invention may be to provide an electronic device that gives a list of services provided to a user at the rental space. Wherein the list of services provided to a user at the rental space may be selected from the group consisting of: laundry pick-up and delivery, propane gas delivery, grocery delivery, pizza delivery, and a mobile mechanic repair service.

The present invention has been developed to provide a method of purchasing commodities associated with a golf course, the method at least including: a) providing at least one kiosk under the dominion of a golf course operator; b) via the kiosk, providing to a prospective golfer, available tee times at the golf course; c) via the kiosk, allowing the prospective golfer to reserve one or more tee times; and d) at least partially via the kiosk, processing payment for the selected tee times.

The present invention has also been developed to provide a method of purchasing commodities associated with a ski resort, the method at least including: a) providing at least one kiosk under the dominion of a ski resort operator; b) via the kiosk, providing to a prospective skier, ski lift information at the ski resort; c) via the kiosk, allowing the prospective skier to reserve one or more ski lift tickets; and d) at least partially via the kiosk, processing payment for the ski lift tickets.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

General Description

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules, or systems in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
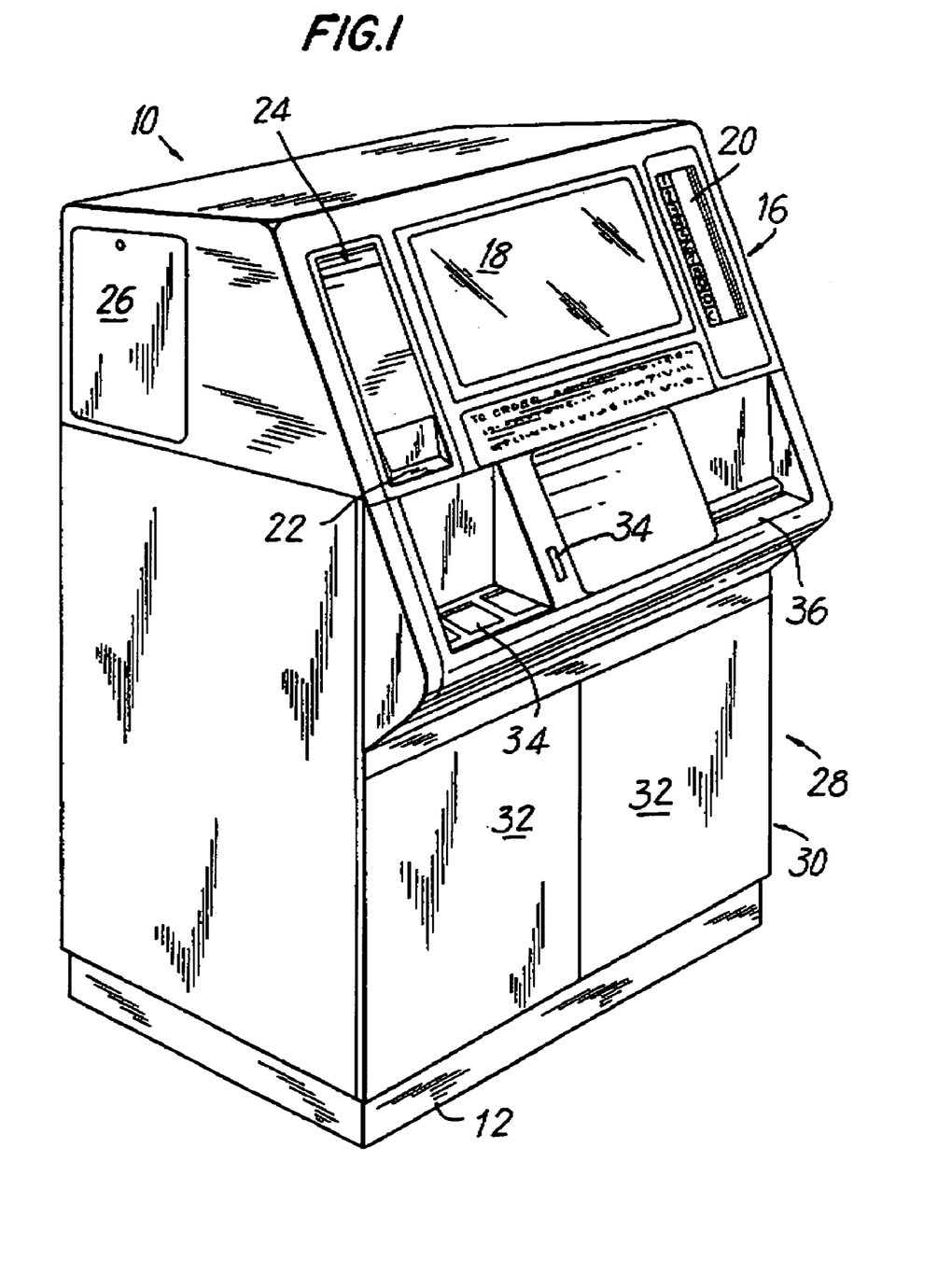
FIG. 1 is a perspective view of an electronic communication device.
Figure 2A:
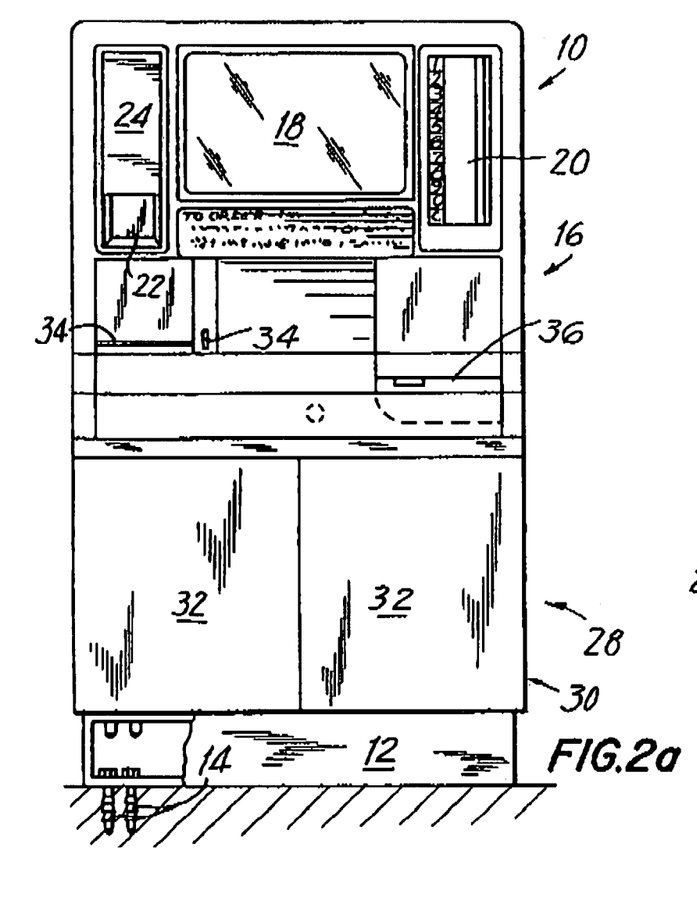
FIGS. 2a and 2b are front and side planer views of an electronic communication device.
Figure 2B:
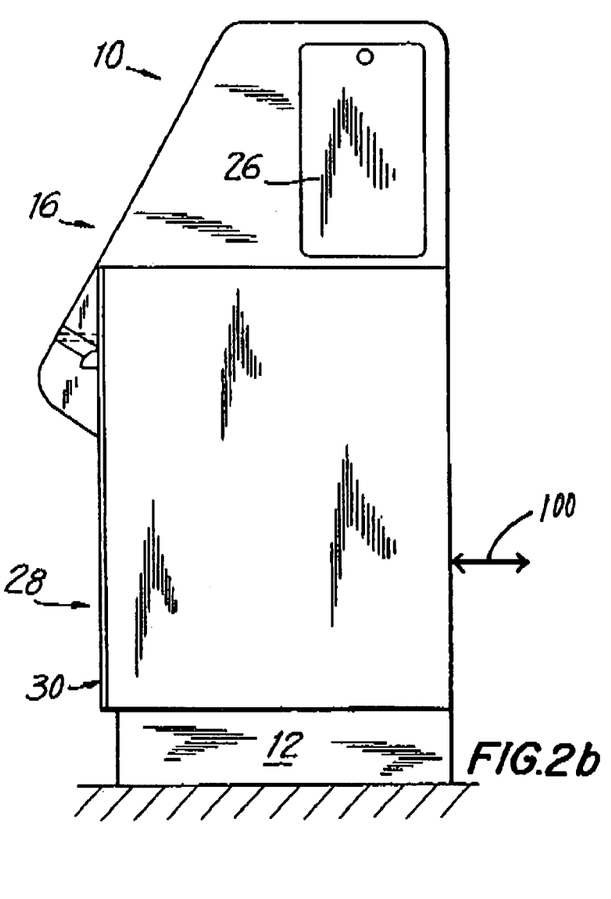

Referring to FIGS. 2a and 2b, one embodiment of the illustrated embodiment(s), there is embodied in a console 10, although the broad meaning of the term "console" is intended to include definitions of (also referred to as a kiosk, or point of sale terminal, or rental communication device). The console is mounted to a pedestal 12, which itself is firmly affixed to the floor, such as by threaded studs 14. The console 10 includes an upper portion 16 bearing a video display tube 18 and the associated electronics, as well as a credit card reader 20, a receipt delivery aperture 22, and an indicator area 24 which displays check-in, check-out and other information and data for a user. Access to the interior of the upper portion may be obtained through a locked access door 26.

The lower portion 28 of the console may comprise a safe 30 having access doors 32, along with coin and bill acceptance ways 34 and a bill and coin change bin 36. Also included in the lower portion is the apparatus necessary to accept, sort and transport customer payments to the appropriate storage magazines and to generate the appropriate change in the necessary form. There is also optional internet connection 100 to enable information stored therein to be accessible through internet connections.

Figure 3A:
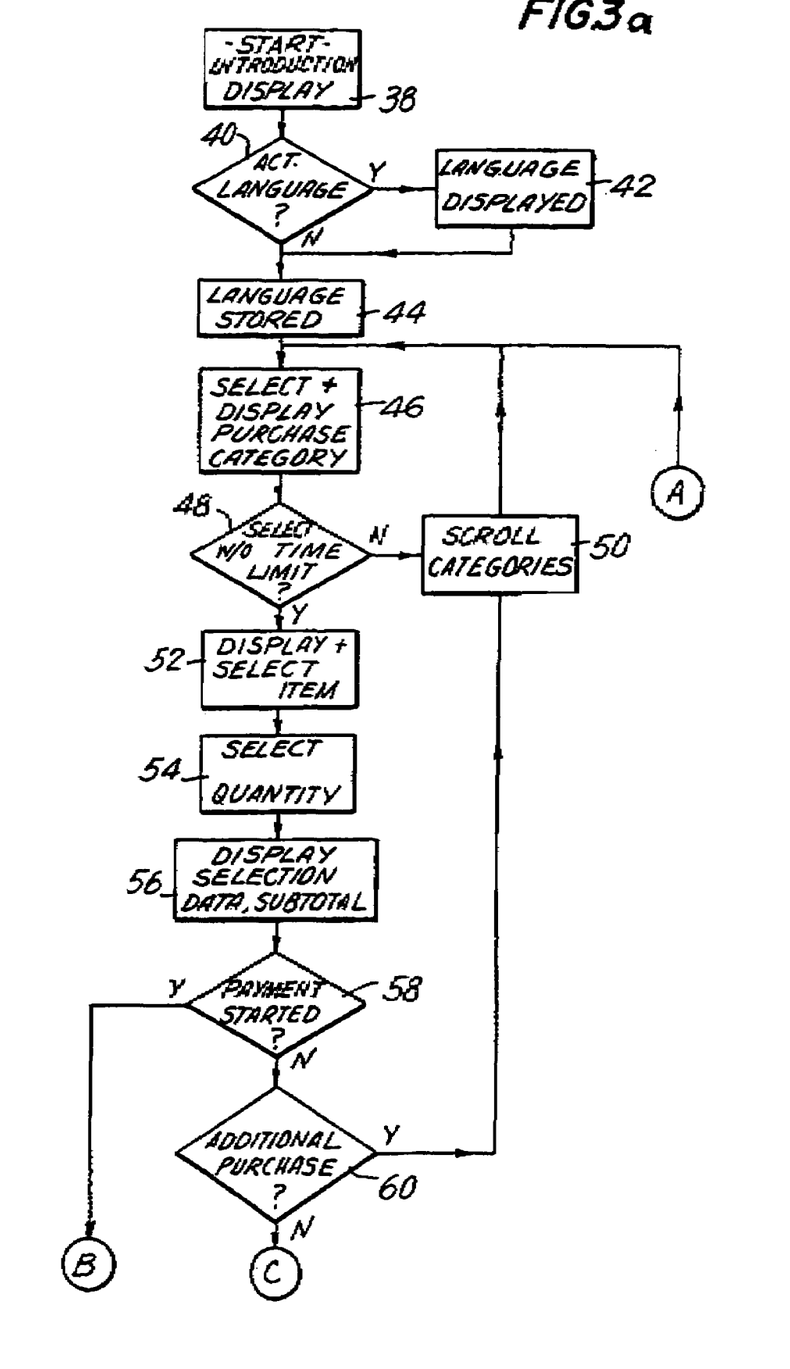
FIGS. 3a and 3b are flow charts of an embodiment of the invention.
Figure 3B:
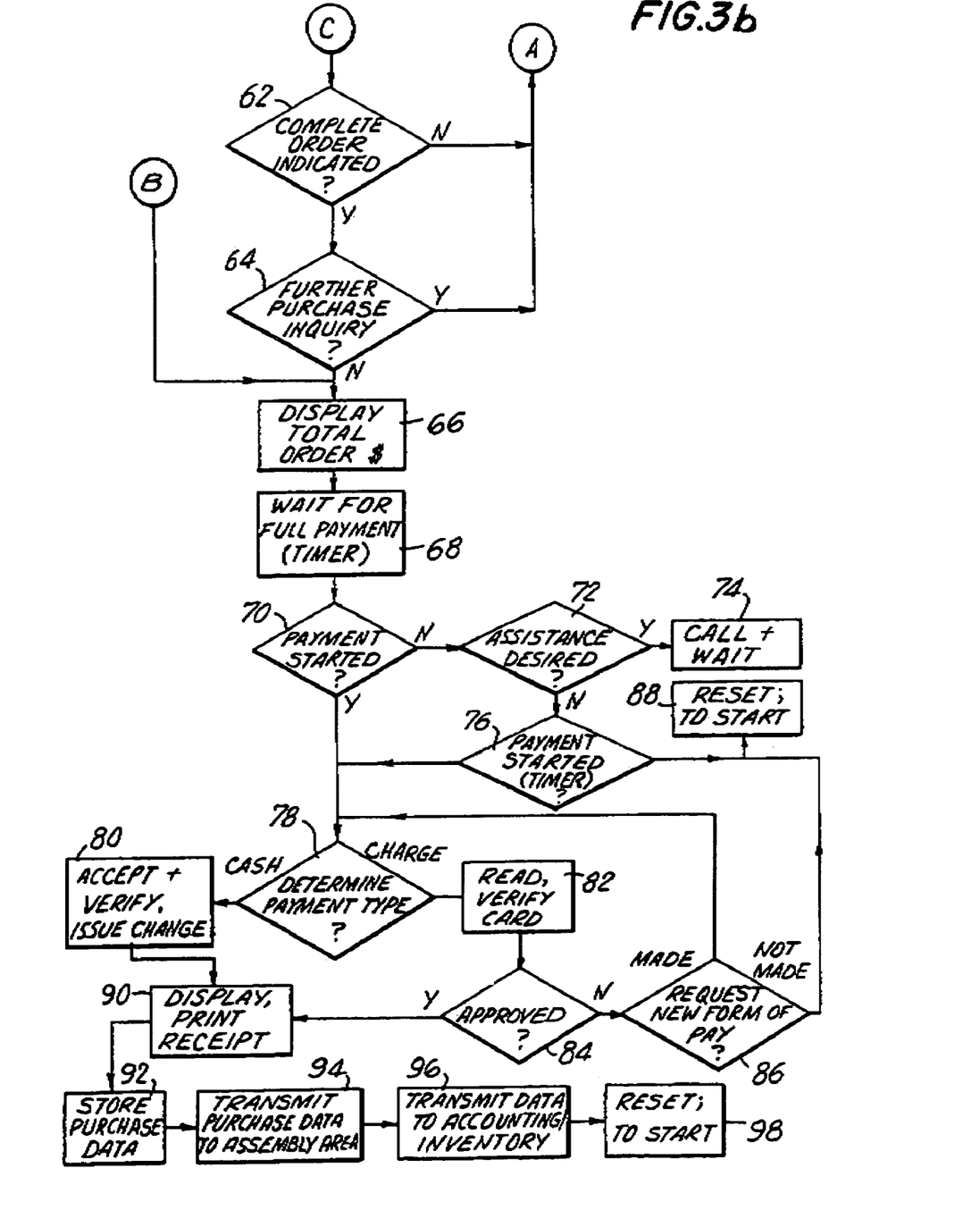

As set forth in the flow charts of FIG. 3a and 3b, the system interfaces with a customer primarily through the computer-controlled, software driven video display screen 18, which both displays information requiring customer response and accepts customer-generated information by use of a touch-screen function as known in the art. Initially, the screen displays an introduction 38, which may include a short explanation of operation, as well as icons of the product or service categories presented by the system. The customer may further be requested to choose an alternative language 40 which then causes an operation branch to display through 42 subsequent commands in the chosen language. The choice of language selected is stored in memory 44 for later retrieval and/or analysis.

The customer is then instructed to choose a category or subject 46. In the example of the RV rental environment, this could range between RV pad selection, like concrete or ground and support services supplied to the RV Park. There may also be additional or sub-screens and categories as required depending upon the number of choices available, like number of days, size of RV, number of adults/children/pets, electrical hook up, water hookup, computer hookup, cable hookup, etc. The software utilized to perform such display is of the type known in the art of displaying information and selection of items. As a screen is displayed, a timer 48 may be engaged to scroll the categories on the screen at 50 if a choice is not made within a certain period of time, such as 10 seconds. The timer may further include logic to revert to start 38 in the event no selection is made within an overall time period.

Once a category is selected, the control program causes the menu items in the category to be displayed 52 and any quantities (i.e. number of days) selected, for example, by known touch screen activation 54. As selections are made, the total check-in is computed and displayed on the screen 56. At any time when a check-in is displayed, the payment of money 58 indicates to the system that the check-in is completed. If money is not received, the system screen queries the customer 60 as to whether additional purchases are required, the system continuing to allow order entry until money is inserted or the customer indicates 62 that the check-in is completed. The user may also specifically indicate that the check-in is complete by activating the appropriate screen icon 64. Once a completed check-in is indicated, the system insures that the check-in is truly complete by inquiring 64 whether a further purchase is desired. If the response is affirmative, the system display returns to the selection loop, displaying purchase categories as required.

If no further purchase is desired, the system displays the total check-in 66 and waits 68 for payment, either by cash or by credit card. One alternative embodiment may allow the renter to stay the night and pay cash in the office the next morning. If no payment is commenced within a certain time designated 70, inquiry is made as to whether assistance is required for the customer 72. An affirmative response causes the system to initiate a call 74 and await action. It may further include a timer to cancel the transaction if further action is not taken within a given time. A failure to respond causes the system to wait 76 for payment for a limited time, such as 20 seconds, canceling the order at the end of the elapsed time period if a transaction has not occurred or payment is not made.

When payment is initiated, either by the insertion of currency or coin or the use of a credit card, the system determines the method of payment 78 by sensors at the payment entry points and branches to the appropriate logic. In the case of money payment, the system accepts and verifies the money, issuing change as required at 80. If a credit card entry is made, by passing the credit card through an appropriate "swipe" reader as known in the art, the system reads the data 82, communicating by modem with an appropriate verifying agency in a known fashion. The system then determines whether approval has been received 84. If approval is denied, the system requests the customer to use another card or cash. If a different payment form is made, the system processes the payment as required, while a failure to make payment within a certain time results in a cancellation of the order and a return to start at 88.

With acceptance of payment, a receipt is generated 90 and provided and displayed in the indicator area 24, which may be in the form of a matrix of light-emitting diodes or other indicators, with the appropriate check-in data being stored in memory 92 and transmitted to the check-in printing area 94 to print a sticker or tag to be displayed in a vehicle window indicating payment for the RV pad space has been made for that period of time.

The appropriate sales data may also be transmitted to a central facility for accounting and inventory purposes, as designated at 96, which transmission maybe do on a real-time, transaction basis or on a batch basis upon inquiry from a remote source. The system then returns to start 98, displaying the introductory display to allow entry of a new check-in. Always present on the screen is a cancel order icon, as well as an icon present during the order entry stage which allows an indicated item to be deleted. Such deletion automatically causes the recalculation of the subtotal.

Pricing information is stored in system memory in a manner which prevents unauthorized alteration. In particular, the primary memory board upon which the information may be stored may be located within the lower console, the safe portion of the console, and is in a non- reprogrammable form. Safe data may be stored elsewhere, such as an intranet server or local/regional server. Functionality of data may be stored local at the kiosk and updated automatically via scheduled download call to a remote server. The data entry and interface circuitry, along with associated memory, which may be located in the upper section of the console, is programmed to transmit to and receive information from the primary memory board, but is unable to direct the memory either to modify prices or to dispense money. Check-in/out revisions are effected by reprogramming of the memory contained in the customer interface unit, but only with certain limits. Data stored on this board is compared to the pricing data stored in the primary memory, and is checked to determine compliance with pre-set limits. For example, the price of an RV pad unit would be stored in primary memory at a range of $20.00-$535.50 per day. The entry of pricing data for display and computational purposes through input into the upper memory is compared to these limits, and cannot be accepted if out of range. In addition, change computation is monitored by primary memory to prevent improper logic commands from being hacked or programmed into upper memory.

Figure 4:
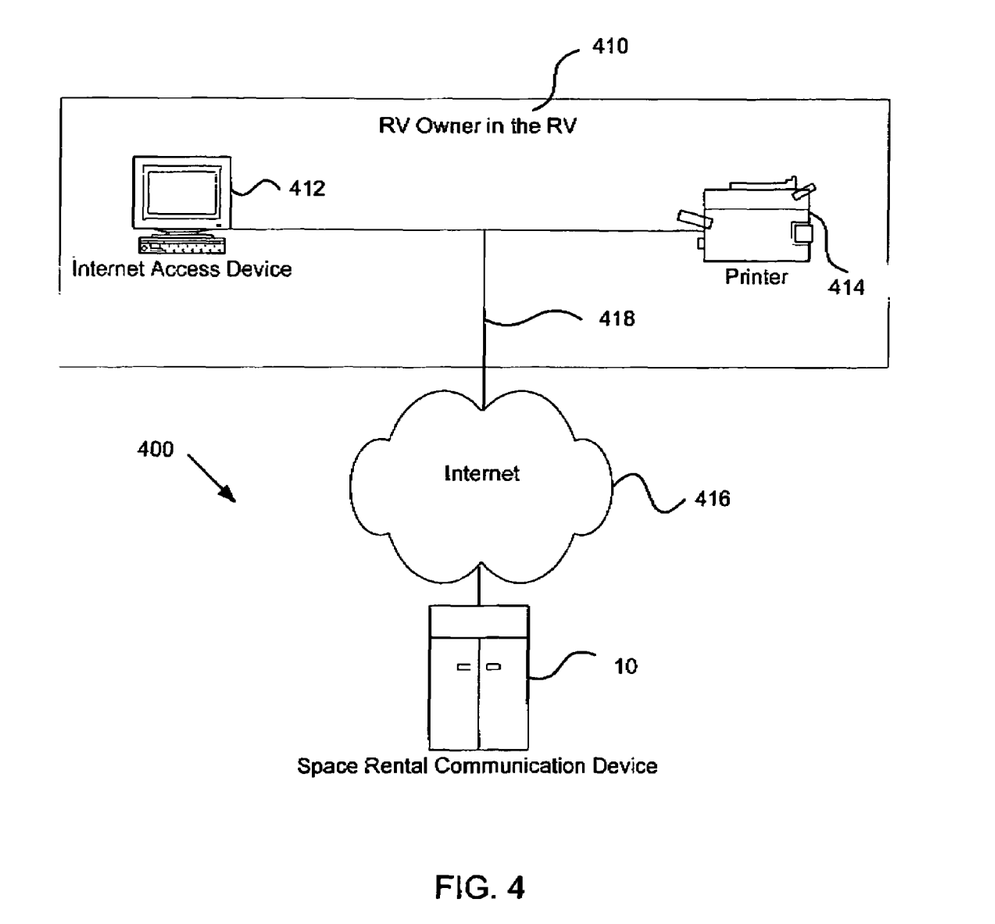
FIG. 4 is a diagram of another embodiment of the invention.

In FIG. 4 illustrates one alternative check-in and check-out embodiment. I, instead of requiring the RV owner 410 to be physically present at the kiosk 10, there is illustrated an internet communication system 400. Specifically, the it is contemplated to enable the RV owner 410 located in their RV, uses an internet access device 412, such as a computer, and a printer 414 to access communicate with the kiosk 10 or receive the internet 416 check-in and other information by way of a hard line connection or wireless connection 418.internet connections 100. In this embodiment, the kiosk 10 serves the purpose of a server holding specific RV site availability data that is accessible via the internet. Although, it is well know that a separate server could also perform the functions of the kiosk 10 in this embodiment. In any case, the exact same selection and payment processes will be followed as described above, except that remote access for check-in/out is now enabled through wireless internet or mobile internet connection.

In another embodiment or module related to the internet system 400, if the RV owner 410. In this embodiment, the RV owner can serf the Web and learn which RV Parks have an opening before driving to the RV Park. Thus, potentially saving vast amounts of time from driving to a park that is already full. Additionally, the RV owner may receive directions to the RV Park, via the internet, to determine whether to proceed to the next one or to stay at the closer one for the night. If the RV owner has a printer 414, it would also be possible to enable the preplanning RV owner to print send a receipt of payment and a sticker or reservation tab to post in the RV window indicating that the RV sites has been paid for. Therefore, this automatic check-in/out internet process 400 further allows the customer 410 to skip "on-site" check-in/out entirely.

In another embodiment or module, using either the internet system 400 or the drive-up kiosk 10 method, it is contemplated to include a map of the RV Park and picture of each RV pad or site and that of the surrounding views scenery or vistas. These views or pictures could be displayed on the kiosk screen 18 or on the computer 412 connected through the internet. This will allow the user to select the desired location and surrounding views scenery without having to drive around the RV Park and picking out a site or looking at a paper map that they would get from the attendant at the front desk. If this embodiment is combined with the internet service, an RV owner can go to an area of the country and select the best site available from several RV Parks. In another embodiment, searches for RV Parks could include logical limitations, like: those RV Parks that are within 30 miles or 1 hour from a current location, only those with electric power, or those with fishing access, etc. This embodiment allows a user to more easily determine where to stay with their RV.

Yet, another embodiment or module contemplates adding additional information of interest to a particular RV park user to the information provided to the check-in users 410 via the kiosk 10 or Internet. For example, there could be lists of area attractions, like parks, zoos, historic sites, museums, etc. This concept can also be extended to providing information about area restaurants, pharmacies, vehicle repair, vehicle washing, grocery stores, or any other destination that is commonly desired by people habituating an RV Park for a period of time. Of course, it would be helpful to provide additional information for all of the above sites, such as maps/directions to get there, costs, seasons open, discounts, etc. This embodiment provides comprehensive information to an RV owner to make their stay enjoyable.

Further, it is another embodiment or module of the invention to include additional selection items, or categories or modules for services to be brought to the rented RV Park site to assist the RV owner on their trip. For example, the categories of services may include: laundry pick-up and delivery, propane gas delivery, grocery delivery, pizza delivery, and a mobile mechanic or repair service. Thus, an RV owner may still be in transit to the RV Park and order, via the wireless internet, pizza to be delivered to the site selected that evening, have a mechanic scheduled to show up the following morning, and have replacement propane gas tanks ordered to be delivered, all without leaving the comforts of their moving RV.

Still a further embodiment or module may be to include sensors 99 at the kiosk to read an identification tag from a vehicle as it drives past, much like an automatic toll booth payment system. In this embodiment, a user may buy a membership to a certain chain of RV Parks. An identification tag would be supplied that provides the kiosk identification sensor with the information sufficient to charge the account of the specific RV owner. Any known means of infrared, radio frequency or other communication means that are known in the art would be suitable, just so an account may be read and charged by simply driving by an appropriate member kiosk or reader. This would further save the RV owner time in having to enter their check-in and out information every time they want to use the rented space.

Figure 5:
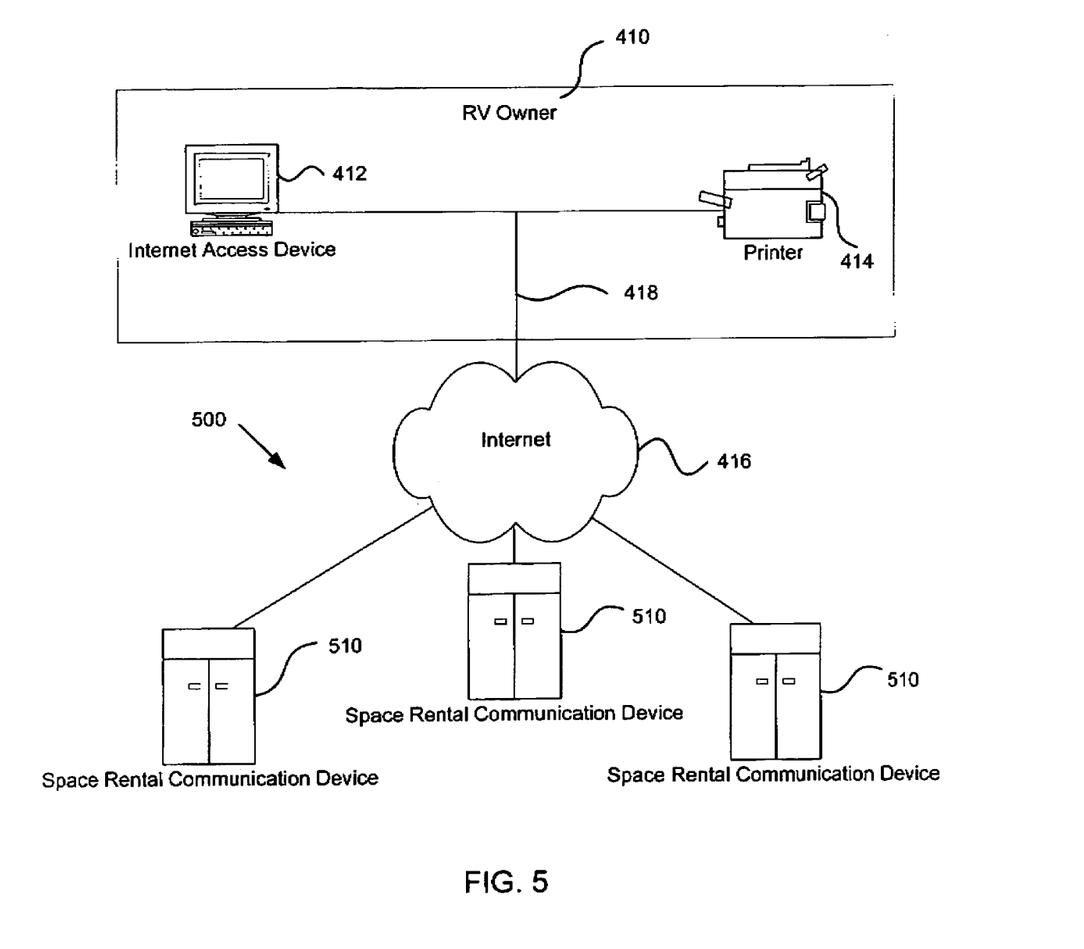
FIG. 5 is a diagram of yet another embodiment of the invention.

FIG. 5 illustrates another embodiment building onto the internet system of FIG. 4. In this internet related embodiment 500, it is contemplated to have a several RV Parks or a chain of RV Parks coupled to the internet 416. This will allow the RV owner 410 to serf the Web 416 and find out which RV Parks (separately owned or in the chain) have an opening before driving to the RV Park. It is noted that the present embodiment of an RV Park was used for illustrative purposes only. One skilled in the art would understand that the illustrated invention could easily include other embodiments, such as, but not limited to a hotel, motel, cabin, property storage unit, camp site, harbor boat slip, cruise ship cabin, etc. Thus, potentially saving vast amounts of time from driving to a park that is already full. Additionally, the RV owner 410 any business that rents, leases, loans, reserves space for occupation may receive directions to the RV Park, via the internet 416, to determine whether to proceed to the next one or to stay at the closer one for the night. Furthermore, the RV owner may plan an entire trip including several different RV Park destinations for the RV from the convenience of their computer, long before actually beginning the travel adventure. In that fashion, the owner may have all the rental fees paid in advance, reservations made, specific sites reserved, sites of interest planned one visiting, travel time calculated between the different sites, and any other advantages provided by having advanced reservations and trip planning for the RV travel experience.

In another embodiment, using either the internet 400 or 500 or drive-up method, computer searches for specific RV Parks could include logical limitations, like: RV parks that will accommodate large RVs, handicap access, those RV Parks that are within 30 miles or 1 hour from a current location, only those with electric power, or those with fishing access, etc. This embodiment allows a user to more easily determine where to stay with their RV.

Yet a further embodiment or module, building on the automatic toll both sensors embodiment specifically, there is another advantage, which allows the user 410 to drive by any member kiosk 10 and be charged for the use of the RV site. Of course, this method of check-in/out would not allow the user 410 to be selective of sites like the previous methods describe. To operate this drive through system, it may be needed to have designated drive-through sites reserved for such an operation.

Another embodiment or module of the present invention is to provide the owner or management with check-in and check-out status reports, audit reports, information management reposts and any other data relevant to the management of the space rental business.

It is further noted that the present embodiment(s) are described as having the illustrated kiosk 10, whereby any type of electronic communication system could be implemented. For example, a wall mounted unit could work, a counter top unit, a unit with the touch screen positioned exterior to the building and the remainder of the unit positioned remote therefrom could also work. Additionally, it is even contemplated that some implementations may not use a kiosk of any sort, but would use only the internet and server arrangement. This set up, however, would only benefit those using the internet.

Golf Tee Times and Ski Resort Lift Tickets

Figure 8:
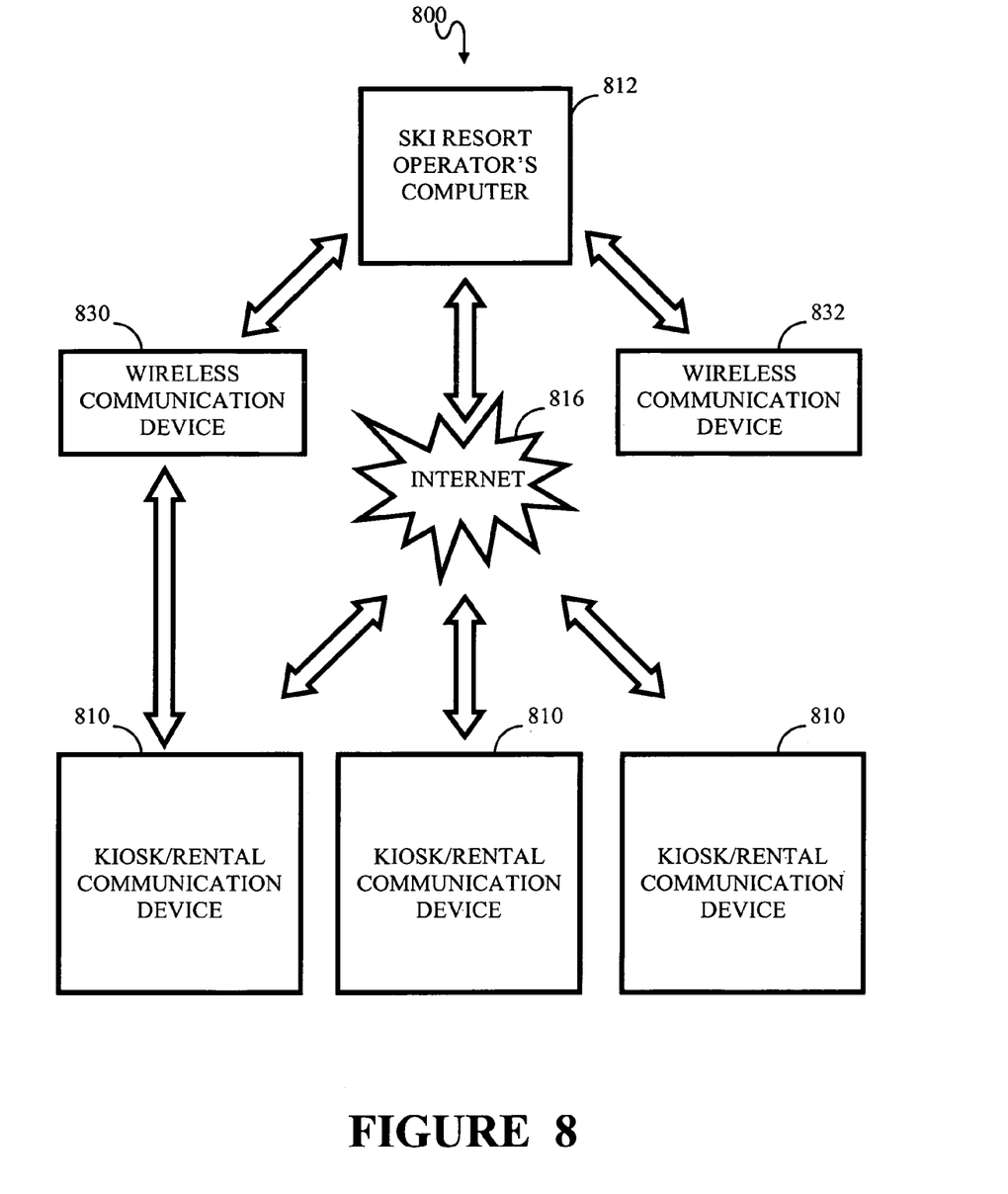
FIG. 8 is yet an additional embodiment of a system according to the present invention related to the scheduling and purchase of ski lift times and tickets.

As has been stated, the teachings of the present invention are applicable to the reservation and purchase of in-demand space and commodity rentals. For example, a general system 600 for the reservation and purchase of golf tee times at one or more golf courses is illustrated in FIG. 6, while a general system 800 for the reservation and purchase of ski lift tickets at one or more ski resorts is illustrated in FIG. 8.

Figure 6:
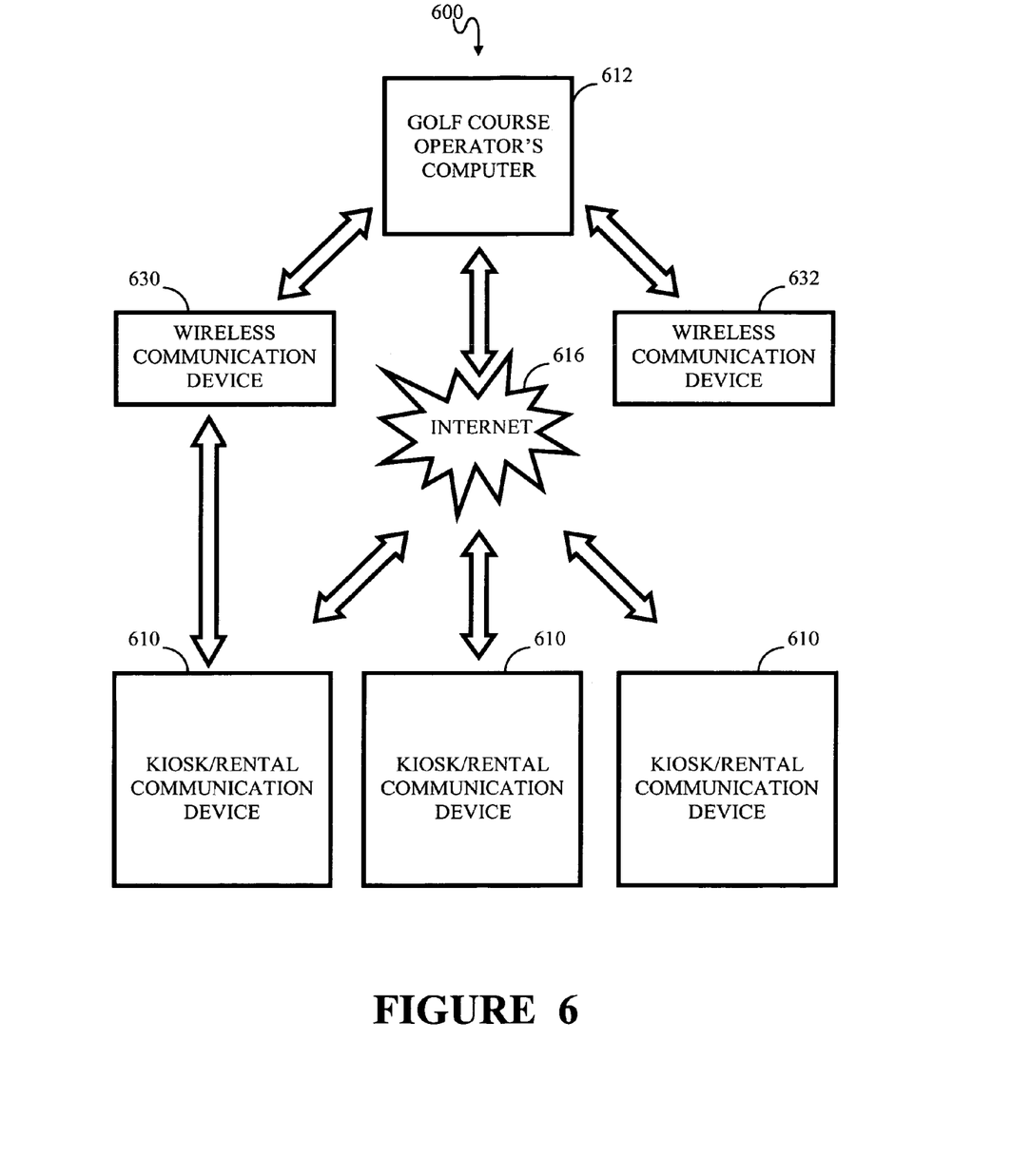
FIG. 6 is a diagram of an additional embodiment of a system according to the present invention related to the scheduling and purchase of golf course tee times and rounds.

Turning to FIG. 6, the system 600 nominally includes at least one rental communication device 610 in the form of an electronic kiosk associated with at least one golf course, wherein the kiosk 610 facilitates the reservation and purchase (e.g., payment of green fees, etc.) of tee times for playing rounds of golf. More than one kiosk 610 can be located on the premises of a golf course. In the preferred embodiment, one or more affiliated golf courses can be linked via the aforementioned kiosks and the Internet symbolically represented by the number 616. Another element of the system is for each golf course networked, a golf course operator's computer 612 responsible for transferring data to and from resident kiosks, and responsible for other control. The computer 612 may be located, for example, at a golf course pro shop.

An additional feature of the system 600 is the use of several portable, wireless communication devices (630, 632) that can be carried by golfers and golf course personnel. The communication devices are capable of allowing a user to electronically enter scores of golf rounds being played, and transmit those scores to either the golf course operator computer 612, or to the kiosks 610, or to both. The kiosks 610 are then able provide information about current or previous golf round scores to prospective golfers via the kiosks, or through the prospective golfer's own communication device.

Figure 7:
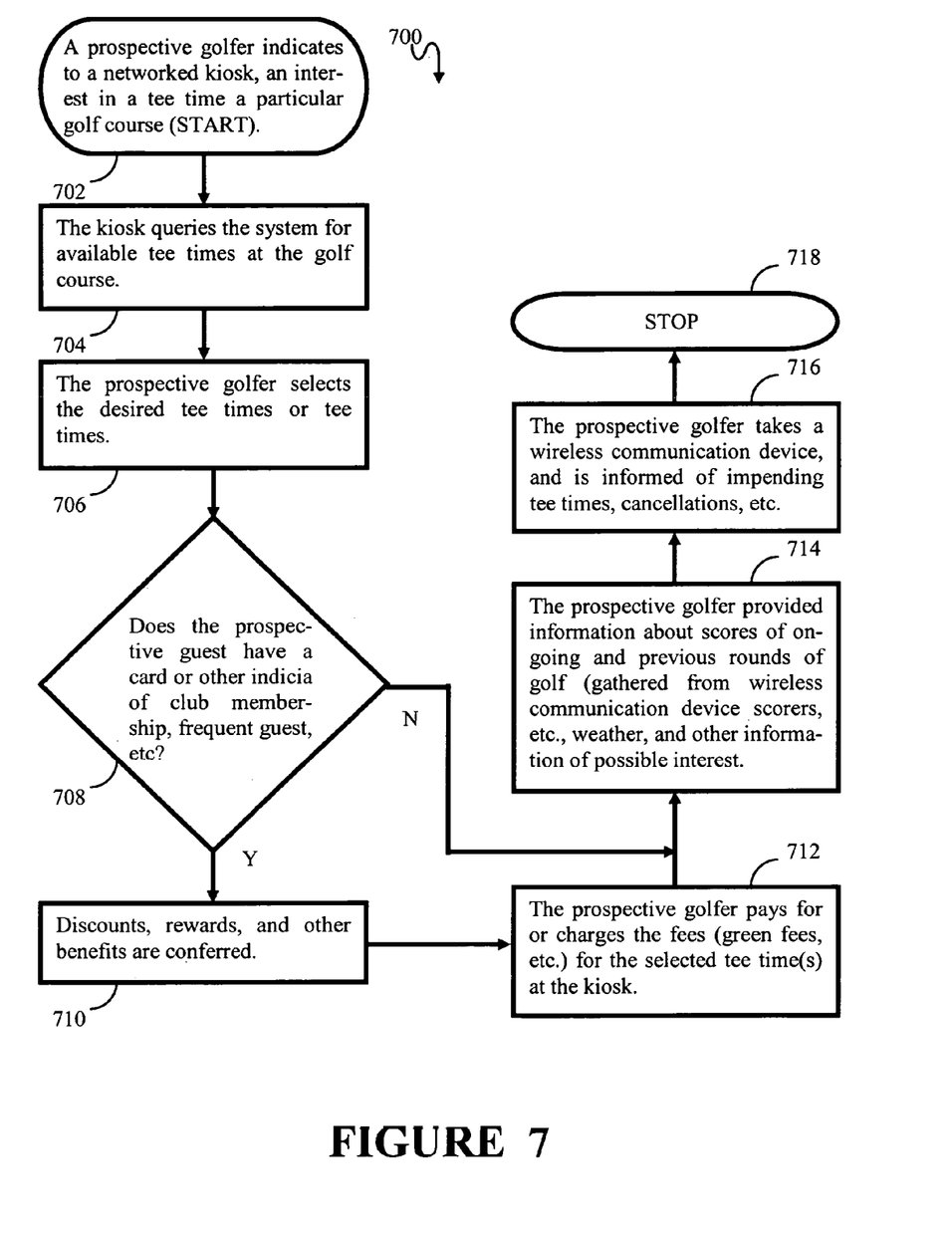
FIG. 7 is a diagram of an additional embodiment of a method according to the present invention related to the scheduling and purchase of golf course tee times and rounds.

The algorithm 700 illustrates the general method used for allowing a prospective golfer to reserve and pay for tee times. The algorithm beings in Step 702 when a prospective golfer indicates via a kiosk, an interest in acquiring a tee time at either the golf course where the kiosk is located, or at another affiliated golf course. The kiosk queries its own database, and other databases such as those kept by the golf course operator computers, or other networked kiosks (at other affiliated golf courses, for example) in Step 704. In the next step (706) the prospective golfer selects the desired tee time or tee times.

As an added benefit to loyal customers, golf course club members, and the like, the kiosk attempts to determine whether the prospective golfer is entitled to any discounts, rebates, awards, and the like (Step 708). This can be determined by directing the prospective golfer to enter or scan club membership cards, frequent guest cards, or other select merchant-sponsored cards. If the prospective golfer has one or more of the applicable cards, the algorithm moves to Step 710, where the applicable discount, reward, or other benefit is conferred. If not, the algorithm jumps to Step 712. In Step 712, the prospective golfer pays the applicable fee (e.g., green fee) or fees for the selected tee times via the kiosk. In the preferred embodiment, the kiosk is able to process cash, credit, and other card-based transactions for payment.

In Step 714, the prospective golfer is provided with information about current or recent golf rounds of other golfers, and well as weather, and other information of interest. The prospective golfer is also given the opportunity to carry his or her own wireless communication device (630, 632) during the actual rounds of golf, as well as while the prospective golfer waits for the selected tee times. The communication devices also serve to inform the prospective golfer that reserved tee times are drawing near, as well as cancellations of tee times, and the like. The algorithm stops in Step 718.

As was previously mentioned, a similar system 800 (see FIG. 8) manages ski resort reservations, and the purchase of ski lift tickets. The elements of the system 800 perform similar functions to the elements of the system 600, except that subject matter revolves around ski resorts and ski lift tickets rather than golf courses and tee times.

Figure 9:
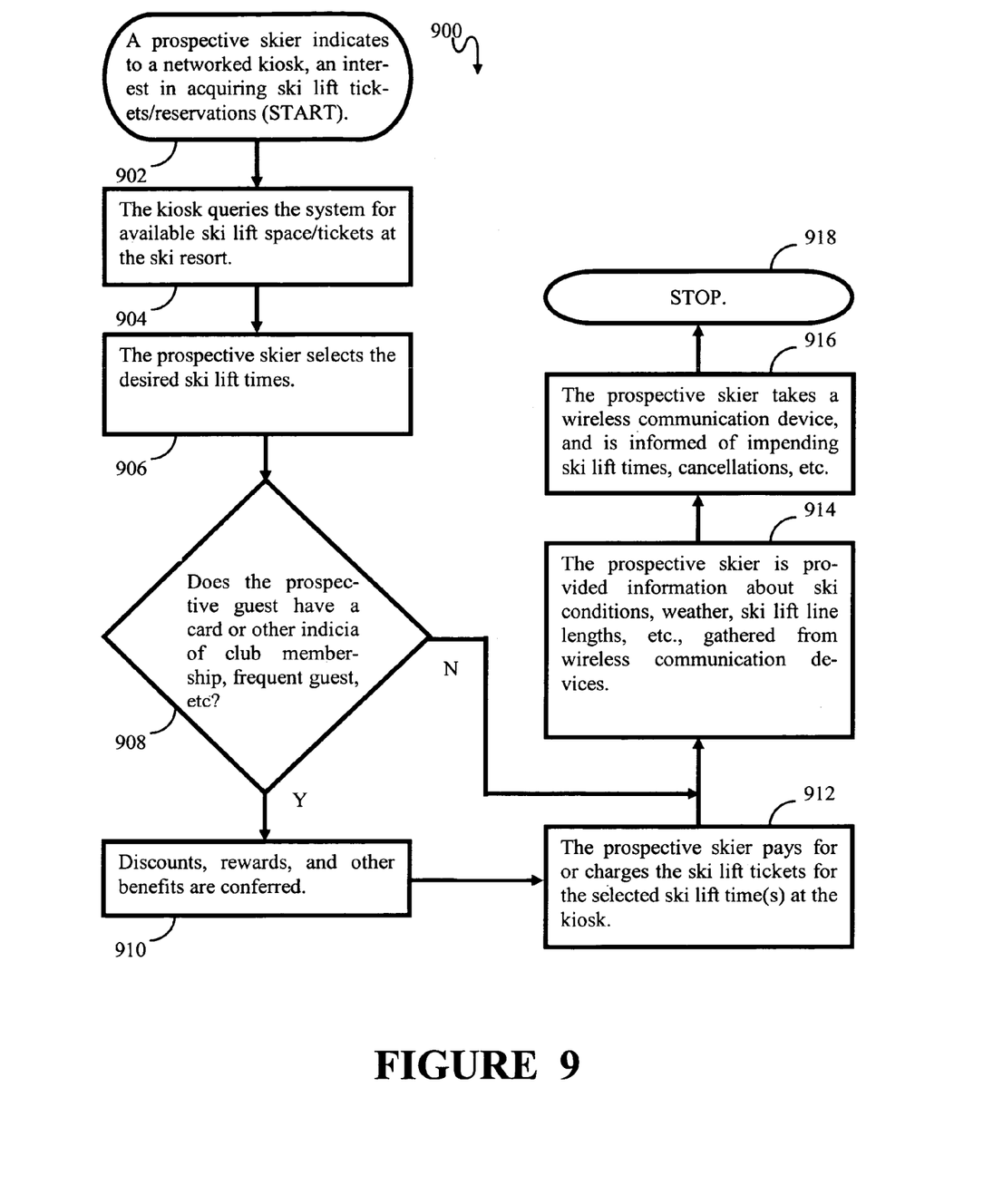
FIG. 9 is yet an additional embodiment of a method according to the present invention related to the scheduling and purchase of ski lift times and tickets.

The algorithm 900 in FIG. 9 is therefore similar to the algorithm 800 in FIG. 8, with a different commodity being purchased. The algorithm beings in Step 902 when a prospective skier indicates via a kiosk, an interest in reserving or acquiring a ski lift ticket at either the ski resort where the kiosk is located, or at another affiliated ski resort. The kiosk queries its own database, and other databases such as those kept by the ski resort operator computers, or other networked kiosks (at other affiliated ski resorts, for example) in Step 904. In the next step (906) the prospective skier selects the desired ski lift time or ski lift ticket.

To reward loyal customers, the kiosk attempts to determine whether the prospective skier is entitled to any discounts, rebates, awards, and the like (Step 908). This can be determined by directing the prospective skier to enter or scan club membership cards, frequent guest cards, or other select merchant-sponsored cards. If the prospective skier has one or more of the applicable cards, the algorithm moves to Step 910, where the applicable discount, reward, or other benefit is conferred. If not, the algorithm jumps to Step 912. In Step 912, the prospective skier pays the applicable fee or fees for the selected ski lift tickets via the kiosk.

In Step 914, the prospective skier is provided with information about current ski conditions, weather, ski lift line lengths, and other information that may be of interest. This information may be at least partially gathered from wireless communication devices (830, 832) similar to the devices 630 and 632 (see the discussion regarding FIG. 6, supra.). The prospective skier is also given the opportunity to carry his or her own wireless communication device during actual skiing and during other activities at the ski resort. The communication devices also serve to inform the prospective skier or opportune times for taking ski lifts. The algorithm stops in Step 918.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of purchasing commodities associated with a golf course, said method comprising:
   a) providing at least one kiosk under the dominion of a golf course operator;
   b) via said kiosk, providing to a prospective golfer, available tee times at said golf course;
   c) via said kiosk, allowing said prospective golfer to reserve one or more tee times;
   d) at least partially via said kiosk, processing payment for the selected tee times;
   e) providing a plurality of portable wireless communication devices to golfers playing a golf round on a golf course, said communication devices adapted to electronically record golf round scores and communicate said scores to a centralized database; and
   f) communicating said golf round scores to a prospective golfer via a kiosk.

2. The method of claim 1, further comprising:
   f) allowing a prospective golfer to present credentials entitling said prospective golfer to more favorable financial treatment than otherwise; and
   g) on account of element f), reducing the payment in element d).

3. The method of claim 2, wherein said credentials comprise membership in a club affiliated with said golf club.

4. The method of claim 2, wherein said credentials comprise said prospective golfer having previously visited said golf course.

5. The method of claim 2, wherein said credentials comprise accumulating a threshold amount of points awarded for previous patronage.

6. The method of claim 1, wherein element d) is at least partially carried out via said prospective golfer submitting a credit card to said kiosk.

7. The method of claim 1, wherein element d) is at least partially carried out via said prospective golfer submitting currency to said kiosk.

8. The method of claim 1, further comprising:
   electronically networking kiosks from a plurality of golf courses;
   providing tee times for the plurality of golf courses; and
   allowing said prospective golfer to reserve a tee time associated with a golf course remote from the kiosk being used by said prospective golfer.

9. The method of claim 1, further comprising:
   via a communication device, notifying a prospective golfer of tee time cancellations or no-shows.

10. The method of claim 1, wherein pricing information is stored in a non-reprogrammable form.

11. The method of claim 1, wherein the portable wireless communication devices are configured to inform prospective golfers that reserved tee times are drawing near.

12. A method of purchasing commodities associated with a ski resort, said method comprising:
   a) providing at least one kiosk under the dominion of a ski resort operator;
   b) via said kiosk, providing to a prospective skier, ski lift information at said ski resort;
   c) via said kiosk, allowing said prospective skier to reserve one or more ski lift tickets; and
   d) at least partially via said kiosk, processing payment for the ski lift tickets;
   e) allowing a prospective skier to present credentials entitling said prospective skier to more favorable financial treatment than otherwise; and
   f) on account of element e), reducing the payment in element d).

13. The method of claim 12, wherein said credentials comprise membership in a club affiliated with said ski resort.

14. The method of claim 12, wherein said credentials comprise said prospective skier having previously visited said ski resort.

15. The method of claim 12, wherein said credentials comprise accumulating a threshold amount of points awarded for previous patronage.

16. The method of claim 12, wherein element d) is at least partially carried out via said prospective skier submitting a credit card to said kiosk.

17. The method of claim 12, wherein clement d) is at least partially carried out via said prospective skier submitting currency to said kiosk.

18. The method of claim 12, further comprising:

electronically networking kiosks from a plurality of ski resort;

providing access to ski lift information for a plurality of ski resort; and allowing said prospective skier to reserve a ski lift ticket associated with a ski resort remote from the kiosk being used by said prospective skier.

19. The method of claim 12, further comprising:

providing a plurality of portable wireless communication devices on the premises of said ski resort, said communication devices adapted to electronically record condition information regarding conditions at said ski resort and communication said condition information to a centralized database; and communicating said condition information to a prospective skier via a kiosk.

20. The method of claim 12, further comprising:

via a communication device, notifying a prospective skier of ski lift user cancellations or no-shows.

* * * * *